June 24, 1941.  F. L. BISHOP, JR  2,247,047
APPARATUS FOR INSPECTING GLASS SHEETS OR THE LIKE
Filed Nov. 18, 1938  2 Sheets-Sheet 2
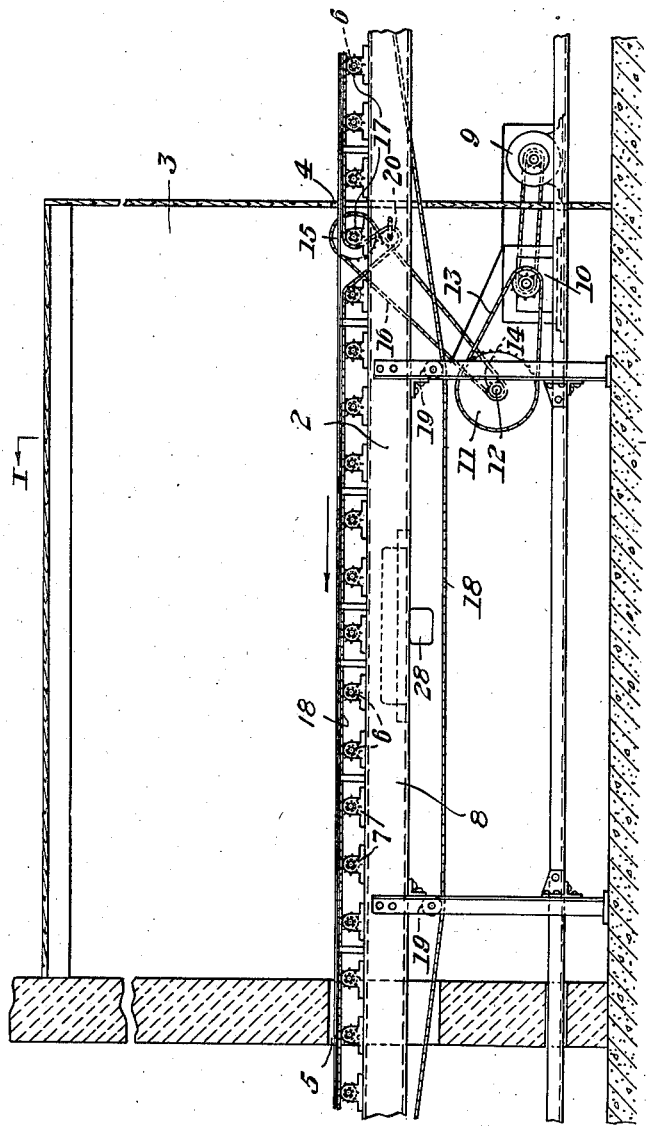
INVENTOR
Frederic L. Bishop, Jr.

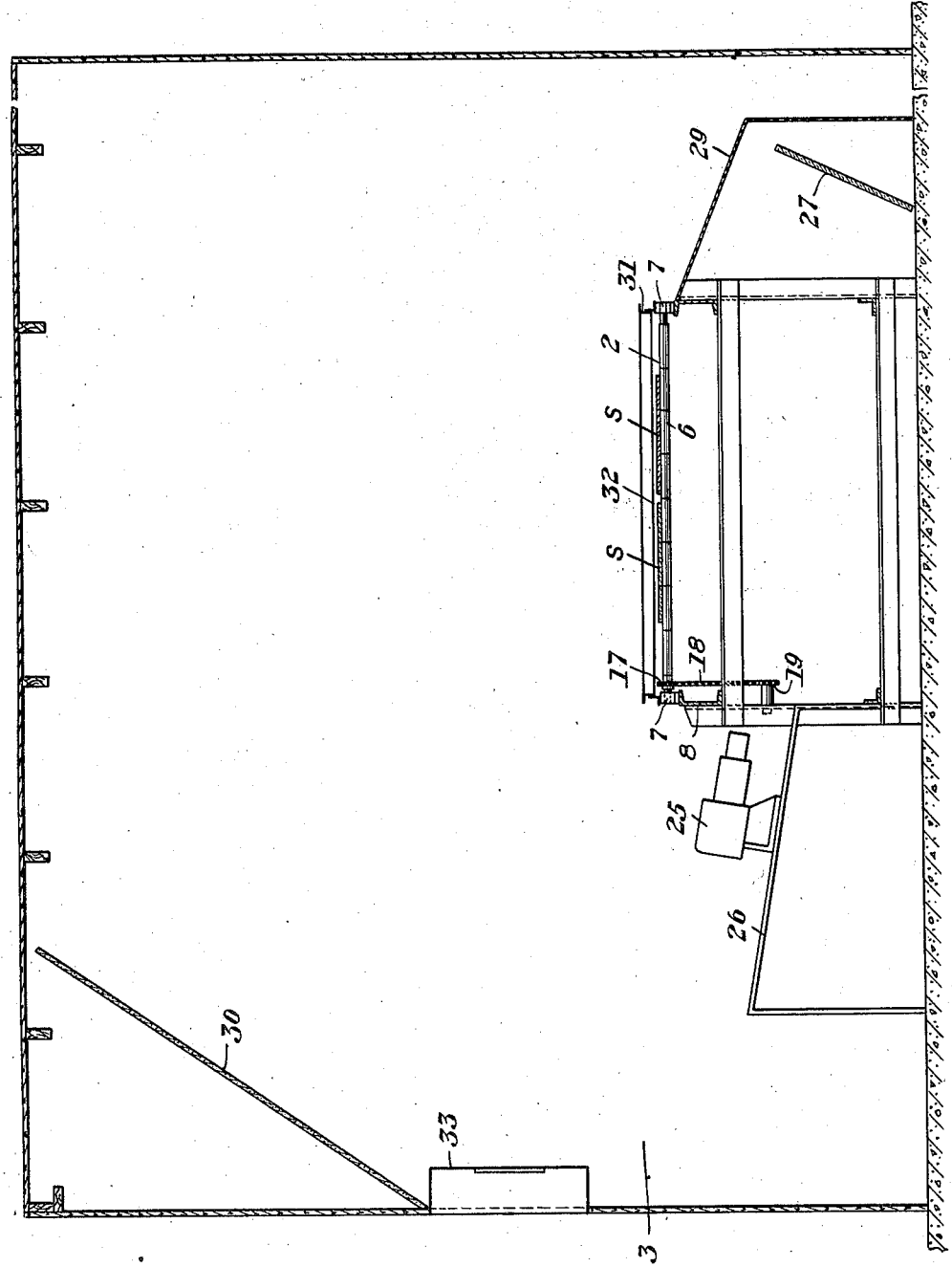

Patented June 24, 1941

2,247,047

UNITED STATES PATENT OFFICE 2,247,047

APPARATUS FOR INSPECTING GLASS SHEETS OR THE LIKE

Frederic L. Bishop, Jr., Jeannette, Pa., assignor to American Window Glass Company, Pittsburgh, Pa., a corporation of Pennsylvania Application November 18, 1938, Serial No. 241,184

9 Claims. (Cl. 88—14)

The present invention relates to the inspection of glass sheets or other similar transparent articles for the purpose of ascertaining the existence and extent of any defects which may exist in such articles. It provides an apparatus whereby such defects may be discerned very readily and whereby an appropriate and rapid visual comparison can be made between the articles which are being inspected and any suitable standards which may be established. While the invention is not limited to the inspection of glass sheets, it is particularly adapted for this purpose and will be described herein as so applied.

Pursuant to the present invention I pass a beam of light from a light source through the glass sheet being inspected at a predetermined acute angle relative thereto and cast the light upon an appropriately positioned screen. The image of the glass sheet and any defects which may appear therein can then be seen on the screen. If there are no defects in the glass sheet the image of a sheet alone may be seen on the screen and the image will be clear and free of any dark spots or of any waves or lines. If the glass sheet is not of uniform thickness and contains waves, or if there are other defects in the glass sheet, such as composition lines, stones and the like, and if the glass sheet is not uniform in other respects, these defects may readily be seen on the screen.

Ordinarily differences in thickness of the glass sheet or waves therein which will distort the beam of light passing therethrough or other types of defects can be discerned with ease on the screen without the use of comparison lines, but pursuant to my invention I provide one or more lines which are positioned so that they will be distorted to a greater or lesser degree, depending upon the extent of the light distortion caused by the defects in the glass sheet. I preferably provide lines of this character between the glass sheet and the screen but it will be apparent that these lines may be positioned between the light source and the glass sheet. In any event, it is desirable to position the lines as close as practicable to the glass sheet because by so doing the effect of the distortion thereon will be greater than will be the case if there is a substantial distance between the lines and the glass sheet. These comparison lines may assume any suitable form but I have found it desirable to use a plurality of relatively thin rods or wires which are positioned diagonally with respect to the normal direction of the distortion lines in the glass sheets to be inspected.

The present invention provides an apparatus for inspecting the glass sheets while the glass sheets are either stationary or being carried past the light beam by means of appropriate conveying mechanism. In its application to stationary examination of glass sheets the light beam is directed toward an appropriate screen and the glass sheet mounted on a stationary frame between the light source and the screen. The frame is of such character as to hold the glass sheet at the proper predetermined acute angle relative to the light beam passed therethrough. In the application of my invention to a continuous inspection system, the light beam is directed toward the screen and the glass sheets carried through the light beam between the light source and the screen on appropriate conveying mechanism such as a roller conveyor. In this system, the light is passed directly from the light source to the screen through the glass sheets on the conveying mechanism or, in order to conserve space, the light beam can be directed from the projector onto an appropriately positioned mirror which will reflect the beam through the conveying mechanism and the glass sheets carried thereby onto the screen.

I have found that the angle at which the light beam passes through the glass sheet is of substantial importance. I have found that it must be passed through the glass sheet at an acute angle and that best results can be obtained where the beam passes through the glass sheet at an angle of from 27° to 33°, although entirely satisfactory results can be obtained if the angle is between 20° and 40°. Between 27° and 33°, however, the distortion and other defects in the glass sheet will show up to a more marked degree than is the case where a lesser or greater light angle is utilized.

I have also found that the relationship between the distance from the light source to the glass sheet and from the glass sheet to the screen is of considerable importance. I have found that best results can be obtained with ordinary light projecting mechanism where the distance from the glass sheet to the screen is approximately 60 to 70% of the distance from the light source to the glass sheet. The preferable relationship within these limits is approximately 67%. Reasonably satisfactory results can be obtained where there is a departure from these preferred distances. This is particularly true where it is possible to obtain a light source which can be focused at infinity in a lesser distance from the glass sheet than is possible with the ordinary projecting mechanism and sufficient spread of light still obtained to permit the inspection of the entire area of the glass sheet.

In the accompanying drawings I have shown for purposes of illustration only a preferred embodiment of my invention as applied to a continuous inspection system. In the drawings—

Figure 1 is a transverse section through a room embodying apparatus for carrying out my invention, the conveying mechanism being shown in section and the light projecting apparatus being shown partially in elevation and partially in section;

Figure 2 is a side elevational view of the conveying mechanism shown in Figure 1; and Figure 3 is a plan view of the frame carrying the comparison lines.

As shown in the drawings the glass sheets "S" to be inspected are placed on one end of the conveyor 2 outside the dark room 3. The conveying mechanism extends through a suitable opening 4 in one wall of the room 3 and the glass sheets are carried into and through the room 3 in a horizontal position on the conveying mechanism and then pass out of the inspecting room 3 through the opening 5 in the opposite wall thereof. One end of the conveying mechanism extends through this opening 5 and the conveying mechanism carries the glass sheets which have been inspected to an appropriate discharge station outside the inspecting room.

The conveying mechanism includes a plurality of spaced rollers 6 which are adapted to support the glass sheets and to cause them to travel through the inspecting room. The ends of each roller 6 are mounted in bearings 7 carried by the frame 8 of the conveying mechanism. These rollers are all driven by means of appropriate driving mechanism. A motor 9 through appropriate speed reducing mechanism 10 drives a sprocket wheel 11 carried by a shaft 12 mounted on the frame of the conveying mechanism, the drive from the speed reducing mechanism to the sprocket wheel 11 being effected by means of a chain 13. Rotation of the sprocket wheel 11 rotates the shaft 12, which carries another sprocket wheel 14 for driving the sprocket wheel 15 by means of a chain 16. The sprocket wheel 15 is keyed to one of the rollers 6 so that upon driving the sprocket wheel 15 the roller 6 upon which it is mounted will be rotated. The roller 6 which carries the sprocket wheel 15 adjacent one end thereof is provided with a small sprocket wheel 17 adjacent the other end thereof. All of the other rollers 6 are provided with similar sprocket wheels 17 which are keyed thereto. All of the sprockets 17 cooperate with a continuous chain 18 so that upon driving the roller carrying the driven sprocket wheel 15 all of the rollers will be rotated in the same direction. The lower reach of the continuous chain 18 extends beneath rollers 19 carried by the main frame and a chain take-up 20 is provided for taking up any slack in the chain.

A projection 25 is mounted on a suitable support 26 on one side of the conveying mechanism and a mirror 27 is mounted on the opposite side of the conveying mechanism. An opening 28 is provided in the frame of the conveying mechanism to permit the light from the projector to pass therethrough to the mirror 27. The mirror 27 is mounted within a shield 29 which is for the purpose of preventing stray light beams from striking the mirror. The mirror 27 is inclined at an appropriate angle to cause the light beam cast upon it from the projector 25 to pass upwardly through the glass sheets "S" at an acute angle and to strike the screen 30 which is mounted above the conveying mechanism.

A frame 31 carrying a plurality of diagonal lines or wires 32 is mounted on the conveying mechanism, the frame 31 extending across the top of the conveying mechanism and the glass sheets carried thereby. This frame is positioned in the path of the light beam passing from the mirror 27 through the glass sheets to the screen 30.

In the inspection of the glass sheets by means of the apparatus described above, an operator places the glass sheets to be inspected on the conveying mechanism at a loading station outside the room 2. The rollers of the conveying mechanism are of such character that the friction between the rollers and the glass sheets placed thereon will be sufficient to cause the glass sheets to be carried into and through the inspection room, beneath the frame 31 and past the light beam which passes from the mirror to the screen. The operator who is inspecting the sheets stands beside the conveying mechanism and as the glass sheets pass through the light beam the images thereof will be cast upon the screen and the operator will be able to see the images on the screen and determine the extent of the defects in the sheets. In order to enable the operator to more carefully classify the glass sheets which are being inspected, an illuminated photograph of a standard sheet may be mounted in a box 33 located on a side wall of the room adjacent the screen 30. This standard which is to be used for comparative purposes can be obtained by taking a photograph of the image of the standard sheet when the image thereof is projected on the screen 30. As the glass sheets pass the operator or inspector he can readily mark them according to their qualities. The glass sheets continue on the conveying mechanism and pass out of the inspecting room to a discharge station where they may be removed and classified according to the markings placed thereon by the operator or inspector in the inspection room.

Where an ordinary projector is utilized and where a light spread of approximately 48 inches square is desired, I have found that highly desirable results can be obtained where the distance from the projector to the mirror is approximately 82 inches, the distance from the mirror to the glass sheet is approximately 50½ inches, and the distance from the glass sheets to the screen approximately 89 inches. Care must be taken, however, to see that the projector is located a sufficient distance from the glass sheets to obtain proper focusing and to obtain an appropriate spread of light to take care of the particular size or sizes of sheets to be inspected.

As will be apparent from the above discussion, the light beam passes through the glass sheets on the conveying mechanism at an acute angle relative thereto. In the installation shown in the drawings an angle of 33° is utilized. However, as stated above, angles other than 33° may be utilized and entirely satisfactory results obtained.

It will be apparent to those skilled in the art that the apparatus which I provide by my invention makes possible the continuous inspection of glass sheets. The costs of inspecting glass sheets in accordance with my invention is materially below that prevailing under the present inspecting practices. Savings in excess of one cent per box of glass can be effected by the practice of this invention. Furthermore, the present invention provides apparatus for extremely accurate inspecting and classifying of glass sheets, substantially eliminating all of the guess-work which has been necessary heretofore in the inspection and classification of glass sheets. In addition, the present invention provides an inspection apparatus which discloses various defects and objectionable features in glass sheets which have not heretofore been discernible in any of the inspecting methods utilized. By virtue of the present invention appropriate classification standards can be set up and glass manufactured continuously classified according to these standards without any material slowing up of the manufacturing operations. In addition, pursuant to the present invention, the manual handling of the glass sheets during the actual inspection thereof is totally eliminated and the light beam will be passed through the glass sheets being inspected at a fixed, predetermined angle. This materially increases the efficacy of the inspection as it eliminates errors in classification due to failure of the inspector to examine each sheet at the same predetermined angle.

While I have shown and described a preferred embodiment of my invention, it will be understood that it may be otherwise embodied within the scope of the appended claims.

I claim:

1. Apparatus for inspecting glass sheets comprising a light projector, a screen, a mirror in the path of the light beam generated by said source, said mirror being positioned to cast the light beam upon the screen, conveying means for transporting a glass sheet between the mirror and the screen and for supporting the sheet at an acute angle relative to the light beam passing from the mirror to the screen, and a frame having a plurality of wires extending diagonally with respect to the path of travel of the glass sheet, said frame being positioned in the path of the light beam passing between the mirror and the screen.

2. Apparatus for inspecting glass sheets comprising a light projector, a screen, a mirror in the path of the light beam generated by said source, said mirror being positioned to cast the light beam upon the screen, conveying means for transporting a glass sheet between the mirror and the screen and for supporting the sheet at an acute angle relative to the light beam passing from the mirror to the screen, a frame having a plurality of wires extending diagonally with respect to the path of travel of the glass sheet, said frame being positioned in the path of the light beam passing between the mirror and the screen, and means for shielding the mirror against stray light beams.

3. Apparatus for inspecting glass sheets comprising a light source for projecting a beam of light, an image-receiving screen in the path of said light beam, and means for supporting a glass sheet to be inspected in the path of said light beam and at an angle of approximately 20° to 40° relative thereto, the distances between the screen, the supporting means and the light source being such as to provide a clearly visible image on the screen showing waves and other defects in the sheet and the light beam having a sufficient spread to cover a substantial portion of the sheet.

4. Apparatus for inspecting glass sheets comprising a light source for projecting a beam of light, an image-receiving screen in the path of said light beam, and means for supporting a glass sheet at an angle of approximately 20° to 40° relative to said light beam and for conveying the sheet through the beam, the distances between the screen, the supporting means and the light source being such as to provide a clearly visible image on the screen of waves and other defects in the glass sheet and the light beam having a sufficient spread to cover a substantial portion of the sheet.

5. Apparatus for inspecting glass sheets comprising a light source for projecting a beam of light, an image-receiving screen in the path of said light beam, means for supporting a glass sheet at an angle of approximately 20° to 40° relative to said light beam and for conveying the sheet through the light beam, a linear shadow-forming element, and means for supporting the linear element in the path of the light beam between the light source and the screen, the spread of the beam and the distances between the screen, the light sources and the support for the glass sheet being such as to provide a clearly visible image on the screen.

6. Apparatus for inspecting glass sheets comprising a light source for projecting a beam of light, an image-receving screen in the path of said light beam, means for supporting a glass sheet at an angle of approximately 20° to 40° relative to said light beam and for conveying the sheet through the light beam, a linear shadow-forming element, and means for supporting the linear element in the path of the light beam between the light source and the screen, the spread of the beam and the distances between the screen, the light source and the support for the glass sheet being such as to provide a clearly visible image on the screen, said linear element extending at an angle relative to the path of travel of the glass sheet.

7. Apparatus for inspecting glass sheets comprising a light source for projecting a concentrated beam of light, an image-receiving screen, a mirror in the path of light of the light beam generated by said source and positioned to cast the beam upon said screen, a linear shadow forming element, means for supporting the linear element in the path of the beam, and means for supporting a glass sheet at an angle of approximately 20° to 40° relative to the light beam passing between the mirror and the screen and for conveying the sheet through the beam, the spread of the beam and the distances between the mirror, the screen and the support for the glass being such as to provide a clearly visible image on the screen.

8. Apparatus for inspecting glass sheets comprising an image-receiving screen, a light source for projecting a concentrated beam of light upon said screen, means for supporting a glass sheet to be inspected in the path of said beam and at a substantial acute angle relative to the beam, a linear shadow-forming element, and means for supporting said element in the path of the beam, the distances between the screen, the light source and the sheet supporting means and the angle between the glass sheet and the light beam being such as to provide a clearly visible image on the screen of waves and other defects in the glass sheet and the light beam having a sufficient spread to cover a substantial portion of the sheet.

9. Apparatus for inspecting transparent sheets comprising a light source for projecting a concentrated beam of light, an image-receiving screen in the path of said light beam, and means for supporting a sheet to be inspected between the light source and the screen in the path of said light beam and at a substantial acute angle relative to the beam, the distances between the screen, the supporting means and the light source and the angle between the light beam and the sheet on the support being such as to provide a clearly visible image on the screen showing waves and other defects in the sheet and the light beam having a sufficient spread to cover a substantial portion of the sheet.

FREDERIC L. BISHOP, Jr.

CERTIFICATE OF CORRECTION.

Patent No. 2,247,047.　　　　　　　　　　　　　　　　　　　June 24, 1941.

FREDERIC L. BISHOP, JR.

It is hereby certified that error appears in the printed specification of the above numbered patent requiring correction as follows: Page 2, second column, line 4, for "oppropriate" read --appropriate--; page 3, second column, line 29, claim 5, for ".sources" read --source--; line 51, claim 7, strike out the words "of light"; and that the said Letters Patent should be read with this correction therein that the same may conform to the record of the case in the Patent Office.

Signed and sealed this 5th day of August, A. D. 1941.

(Seal)　　　　　　　　　　　　　　　　　　　　　　　　　　Henry Van Arsdale,
　　　　　　　　　　　　　　　　　　　　　　　　　　Acting Commissioner of Patents.